US011783431B2

(12) United States Patent
Brown et al.

(10) Patent No.: US 11,783,431 B2
(45) Date of Patent: Oct. 10, 2023

(54) FINANCE MANAGEMENT PLATFORM AND METHOD

(71) Applicant: Previse Limited, Essex (GB)

(72) Inventors: David Brown, Bromley (GB); Philipp J. Schönbucher, Bonn (DE); Giulio Rossi, London (GB)

(73) Assignee: Previse Limited, Essex (GB)

( * ) Notice: Subject to any disclaimer, the term of this patent is extended or adjusted under 35 U.S.C. 154(b) by 35 days.

(21) Appl. No.: 15/818,105

(22) Filed: Nov. 20, 2017

(65) Prior Publication Data

US 2019/0087913 A1    Mar. 21, 2019

(30) Foreign Application Priority Data

Sep. 15, 2017   (GB) ..................... 1714876

(51) Int. Cl.
*G06Q 40/12*  (2023.01)
*G06Q 10/067*  (2023.01)
*G06F 16/93*  (2019.01)

(52) U.S. Cl.
CPC ............ *G06Q 40/12* (2013.12); *G06F 16/93* (2019.01); *G06Q 10/067* (2013.01)

(58) Field of Classification Search
CPC .. G06Q 30/0218; G06Q 10/067; G06Q 40/12; G06Q 20/4016; G06Q 30/0248; G06Q 40/125; G06F 16/93; H04M 1/66; G01F 15/007; G01G 23/017; G06K 2017/0064
See application file for complete search history.

(56) References Cited

U.S. PATENT DOCUMENTS

| | | | |
|---|---|---|---|
| 6,167,385 A | 12/2000 | Hartley-Urquhart | |
| 2006/0230006 A1* | 10/2006 | Buscema | G06N 3/0454 706/13 |
| 2009/0063115 A1* | 3/2009 | Lu | G05B 17/02 703/8 |
| 2011/0047476 A1* | 2/2011 | Hochmuth | G06F 3/1431 715/744 |
| 2013/0018796 A1* | 1/2013 | Kolhatkar | G06Q 20/28 705/44 |

(Continued)

*Primary Examiner* — Peter Ludwig
*Assistant Examiner* — Avia Salman
(74) *Attorney, Agent, or Firm* — TUCKER ELLIS LLP

(57) ABSTRACT

A finance management platform and method are disclosed. A model element data repository encodes a plurality of model elements representing invoicing outcomes, each model element including a score value. A processor is configured to execute computer program code for providing a finance management platform for a plurality of clients, including receiving invoicing data from a client data repository remote from the finance management platform, translating the received invoicing data into a common format and store the invoicing data in the common format in an invoice data repository, accessing the model element data repository and determine one or more of the model elements applicable to the invoicing data, calculating an overall score for the invoicing data from the applicable model element's scores and triggering a communication to a payment processor and an update to the invoice data repository upon the overall score exceeding a predetermined threshold.

21 Claims, 1 Drawing Sheet

(56) References Cited

U.S. PATENT DOCUMENTS

| | | | |
|---|---|---|---|
| 2013/0073490 A1* | 3/2013 | Baughman | G06N 3/126 706/13 |
| 2013/0104251 A1* | 4/2013 | Moore | G06F 21/602 726/30 |
| 2013/0332397 A1* | 12/2013 | Scolnicov | G05B 13/02 705/400 |
| 2014/0114825 A1* | 4/2014 | Krikorian | G06Q 30/04 705/34 |
| 2016/0048937 A1* | 2/2016 | Mathura | G06Q 10/0635 705/30 |
| 2016/0055142 A1* | 2/2016 | Strassner | G06Q 30/0201 707/755 |
| 2017/0206460 A1* | 7/2017 | Chang | G16B 5/00 |

* cited by examiner

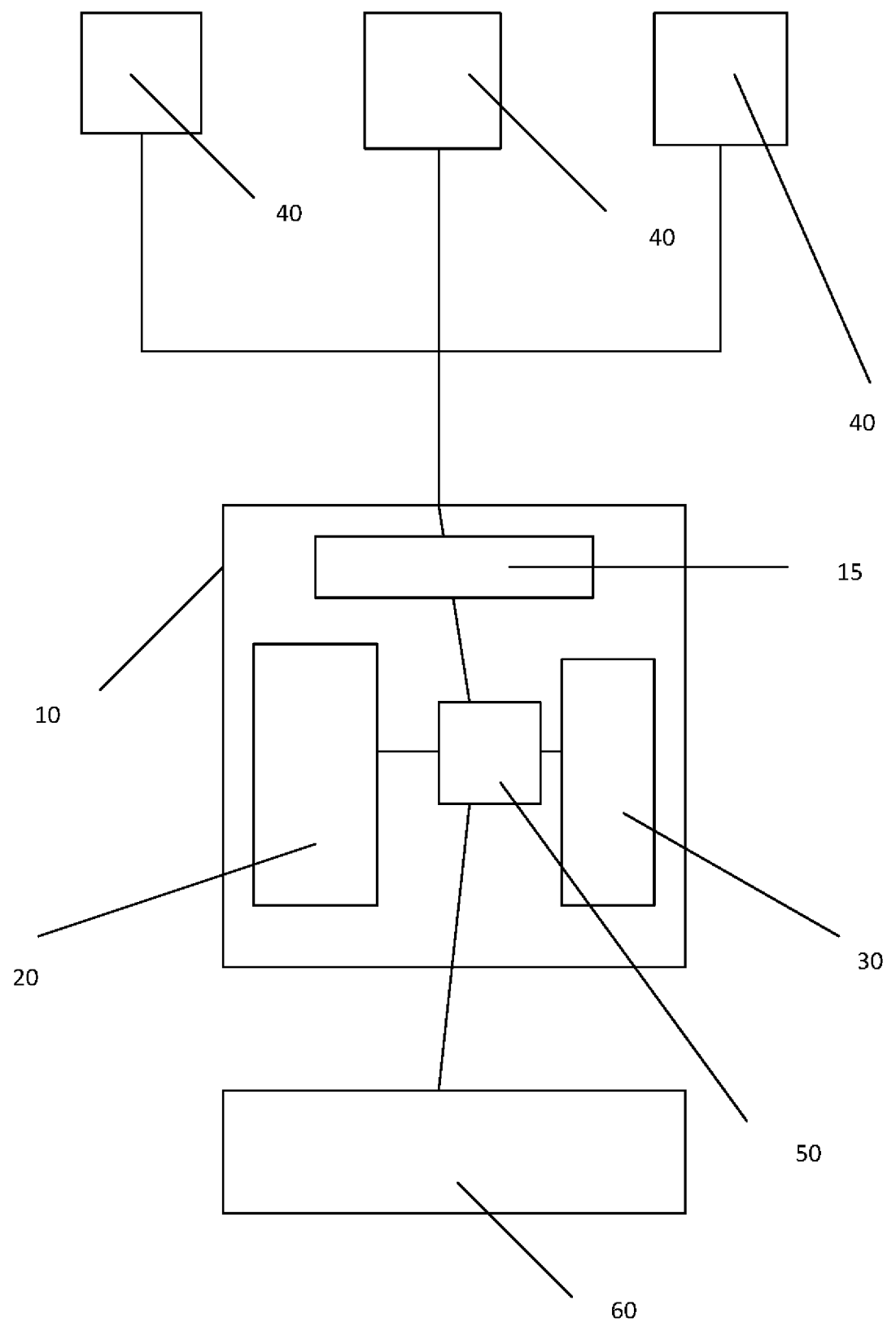

FINANCE MANAGEMENT PLATFORM AND METHOD

CROSS-REFERENCE TO RELATED APPLICATION

This application claims priority to Great Britain Patent Application No. 1714876.8, filed Sep. 15, 2017, which is hereby incorporated by reference in its entirety.

FIELD OF THE INVENTION

The present invention relates to a system and method that are particularly applicable to improving supply chain finance.

BACKGROUND TO THE INVENTION

A supply chain consists of a series of supplier-buyer relationships. While the supplier is interested in any outstanding accounts being settled as early as possible to be able to use this capital for new investments, etc., for the same reasons the buyer is interested in settling as late as possible. For this reason, many suppliers offer discounts on payments being made before the date set in the contractual payment terms.

Traditional supply chain financing (SCF) allows financiers to pay the supplier on behalf of the buyer, who pays the funder back at a significantly later date (the contractual payment date/invoice settlement date). The financing takes place as soon as the Buyer has made an irrevocable, legally binding commitment to settle the invoice ("approval"). The funder makes a profit by claiming a portion of the rebate the supplier offers for fast payments.

In traditional SCF programs, the buyer is typically a large corporation that has relatively low financing rates and a large spend on supplies. The interest-rate differential between buyer and supplier (lower financing rates for the buyer) creates a win-win situation when implementing SCF, as it allows for suppliers with typically higher financing rates to be offered financing at the lower rate of the buyer, thus reducing their interest payments and creating overall savings. This process has been described in U.S. Pat. No. 6,167,385A ("Supply chain financing system and method").

Whilst supply-chain financing has had some take-up by large corporations, it is seen as complex and the implementation and management costs are often considered to outweigh the advantages.

STATEMENT OF INVENTION

According to an aspect of the present invention, there is provided a finance management platform comprising:
a model element data repository encoding a plurality of model elements representing invoicing outcomes, each model element including a score value; an invoice data repository; and,
a processor configured to execute computer program code for providing a finance management platform for a plurality of clients, the computer program code including: computer program code configured to receive invoicing data from a client data repository remote from the finance management platform;
computer program code configured to translate the received invoicing data into a common format and store the invoicing data in the common format in the invoice data repository;
computer program code configured to access the model element data repository and determine one or more of the model elements applicable to the invoicing data;
computer program code configured to calculate an overall score for the invoicing data from the applicable model element's scores;
computer program code configured to trigger a communication to a payment processor and an update to the invoice data repository upon the overall score exceeding a predetermined threshold.

Preferably, the invoicing data is on a single invoice, wherein the computer program code includes:
computer program code configured to identify and link the invoicing data relevant to an invoicing outcome for the single invoice, wherein the computer program code configured to translate the received invoicing data into a common format and store the invoicing data in the common format in the invoice data repository includes computer program code configured to store the linked invoicing data in the common format in the invoice data repository.

Data relevant to an invoicing outcome may include data from a database or stored document, for example, from the invoice, remittances, credits, invoice queries etc. It may be from records in the client data remote repository or from other documents or other data repository/repositories.

Preferably, the invoicing data includes data from the content of the invoice and from content selected from of one or more of another data item, another data source or another data entry concerning the invoice.

The computer program code may further include:
computer program code configured to access the model element data repository and determine one or more of the model elements applicable to the invoicing data;
computer program code configured to calculate an overall score for the invoicing data from the applicable model element's scores; and,
computer program code configured to trigger a communication to a payment processor and an update to the invoice data repository upon the overall score exceeding a predetermined threshold.

The finance management platform may further comprising an input connector configured to communicate with the client data repository and to determine and extract the invoicing data from the client data repository.

The input connector may be further configured to identify a type of the client data repository, retrieve a predetermined mapping associated with the type and determine and extract the invoicing data using the mapping, the mapping comprising a plurality of links, each linking one or more of a data field, a plurality of data fields or part of a data field in the client data repository to an invoice data item.

The input connector may further comprise a machine learning engine configured to retrieve data from the client data repository and to apply machine learning to determine an optimal mapping from a plurality of predetermined mappings to extract the invoicing data, the mapping comprising a plurality of links, each linking one or more of a data field, a plurality of data fields or part of a data field in the client data repository to an invoice data item.

The input connector may further comprise a machine learning engine configured to retrieve data from the client data repository and to apply machine learning to generate an optimal mapping to extract the invoicing data, the mapping comprising a plurality of links, each linking one or more of a data field, a plurality of data fields or part of a data field in the client data repository to an invoice data item.

The machine learning engine may be configured to access the client data repository over a period of time and to optimize the mapping in dependence on the data in the data repository over the period of time.

The input connector may be configured execute computer program code to score a fitness of the mapping and to activate the machine learning engine to re-optimize the mapping upon the fitness score being below a predetermined threshold.

The invoice data repository preferably stores historical invoicing data and current invoicing data, the computer program code configured to calculate an overall score for the invoicing data including computer program code configured to calculate an overall score from the current and historic invoicing data.

Each model element preferably comprises a function, the model elements applicable to the invoicing data defining a directed acyclic graph, wherein computer program code configured to calculate an overall score for the invoicing data from the applicable model element's scores is configured to apply the function for each of the model elements to the invoicing data in an order determined from the directed acyclic graph to calculate the overall score.

According to another aspect of the present invention, there is provided a finance management method comprising: storing in a model element data repository a plurality of model elements representing invoicing outcomes, each model element including a score value;
executing, by a processor, computer program code for providing a finance management platform for a plurality of clients, including:
receiving invoicing data from a client data repository remote from the finance management platform;
translating the received invoicing data into a common format;
storing the invoicing data in the common format in an invoice data repository;
accessing the model element data repository and determine one or more of the model elements applicable to the invoicing data;
calculating an overall score for the invoicing data from the applicable model element's scores;
triggering a communication to a payment processor and an update to the invoice data repository upon the overall score exceeding a predetermined threshold.

The method may further comprise:
accessing the model element data repository and determining one or more of the model elements applicable to the invoicing data;
calculating an overall score for the invoicing data from the applicable model element's scores; and,
triggering a communication to a payment processor and an update to the invoice data repository upon the overall score exceeding a predetermined threshold.

Each model element may comprise a function, the method further comprising:
storing a directed acyclic graph of the model elements applicable to the invoicing data;
wherein the step of calculating an overall score for the invoicing data from the applicable model element's scores includes:
applying the function for each of the applicable model elements to the invoicing data in an order determined from the directed acyclic graph to calculate the overall score.

The directed acyclic graph may have a root model element, one or more intermediate model elements and one or more final model elements, wherein the directed acyclic graph models the topological ordering of the model elements, the method further comprising inputting the invoice data at the root of the graph and applying the corresponding function for the root model element to determine an initial score, following the topological ordering and applying the function for each intermediate and final model element reached and outputting the score from the final model element.

The method may further comprise generating the directed acyclic graph by fitting model elements to a sample of historic invoicing data and corresponding invoicing outcomes obtained from the client data repository.

The functions associated with at least selected ones of the model elements may include parameters, the method further comprising optimizing the parameters in dependence on the sample during fitting.

The step of storing the directed acyclic graph may further comprise storing an encoded representation instructing model elements to be used and how to connect them together to form the graph, the method further comprising recomposing the graph from the representation prior to performing the executing step.

Embodiments of the present invention seek to provide a system and method that significantly improves the efficiency of supply chain finance by eliminating the need for approval of invoices before financing can start, yet still retaining the advantages of the traditional SCF approach. Thus, embodiments of the present invention seek to create added value to all parties involved by freeing up capital earlier than traditionally possible, and opens up SCF to smaller suppliers which previously could not access the programmes.

Conventional supply-chain financing systems rely upon invoice approval. Approval of invoices by the buyer in these systems is necessary to ensure that only buyer default risk is taken by the funding provider, in particular to avoid paying fraudulent invoices or paying for non-satisfactory services provided by the supplier.

However, there are several problems with requiring the approval of an invoice. The approval process is rather unpredictable and labor-intensive as it is typically a manual process. As a result, it is often a bottleneck in the supply-chain financing process.

Advantageously, embodiments of the present invention provide an alternative to requiring buyer invoice approval whilst maintaining security for the funding provider. Additionally, embodiments of the present invention are not only scalable in terms of invoices processed but also in terms of numbers of suppliers—the buyer is not impacted by the number of suppliers served and can therefore choose to source from one or many suppliers. In aggregate, the smaller suppliers produce disproportionately large numbers of small invoices which historically were considered difficult to process and were given low priority in the approval workflow (making the minimum time until payment too large to make a traditional SCF programme attractive). However, in embodiments of the present invention, number of invoices has no substantial bearing on operation of the system and all suppliers can be accommodated.

Embodiments of the present invention seek to provide a system and method that enable a radically new way to finance payments made in buyer-supplier relationships when compared to traditional supply chain finance. It addresses the issues raised previously by making several improvements over current practice:

Firstly, modelling and/or machine learning is used to automate decision making on whether to finance an invoice as soon as it is received by the Buyer. In embodiments of the present invention, instead of waiting for its approval by the buyer (or indeed from when a purchase order is issued by the Buyer), invoices can be automatically processed due to automated data capture and suppliers paid immediately. This drastically improves the benefit of financing invoices with respect to potential rebates granted by suppliers, with respect to the timing of when financing is available to suppliers, and with respect to improving financial metrics. In traditional supply chain finance, the funder waits to issue a payment until an invoice is approved, which can take typically between 10 and 30 days (or longer). This waiting period is eliminated in embodiments of the present invention.

Secondly, while the buyer's approval process may continue in the background, embodiments of the present invention are not reliant on this. In embodiments of the present invention, a data processing platform executes remotely of the buyer and supplier and is arranged to automatically obtain invoices to be paid, execute a computer algorithm to determine a score representing the "likelihood to pay" of the Buyer and automatically trigger payments for invoices exceeding a particular threshold linked to the score. This results in a significant improvement in speed, and the ability to scale the programme to very large volumes of invoices that traditional SCF programmes have not been able to handle in an economic way so far.

Thirdly, embodiments of the present invention reduce the uncertainty about the risk of the financing to the funders by use of an algorithmic prediction model based on past data of companies.

This feature, which can be thought of as a "rating agency" or "FICO score" for business payments, makes the risk much more manageable for funders and makes it possible to create new and more complex financial products based on supply chain financing.

In preferred embodiments, invoices are automatically transmitted from the buyer to the platform, scored automatically (including the application of additional eligibility criteria provided by the funding provider) and paid after the decision on the funding was transmitted automatically to the funding platform. During this process, the payment to be made is calculated using any discounts granted or other deductions applicable.

In another feature, executed funding transactions are automatically reported to the buyer, and the invoices funded are flagged as such in the buyer's system.

In another feature, funders and suppliers can view information relevant to them in a web-based information portal. This portal also allows buyers to get an overview of all invoices processed by the system, including authorised and rejected invoices, and allows suppliers to reconcile the payments they received with the underlying economic transactions that gave rise to them.

In another feature, the scores of the invoices, the buyer's approval decision and the final settlement instructions for the buyer are transmitted via a web-based connector to the buyer's ERP systems.

In another feature, for each payment run planned by the buyer, the system identifies and records automatically all invoice settlements planned by the buyer. The system compares these planned invoice settlements with the list of funded invoices whose payment terms will have been reached by the date of the planned payment run (due or overdue funded invoices).

In cases where a due or overdue funded invoice is not settled in full, the shortfall is calculated and the invoice information and the shortfall amount are automatically added to a ledger of open overpayments.

In cases where a payment is planned to a supplier who has open overpayments, the system automatically calculates and records the following quantities: the deduction from the planned payment necessary to cancel the open overpayment (capped at the total amount of the originally planned payment), the new (reduced) payment to be made to the supplier, and the remaining amount of open overpayments (if any).

Depending on configuration, the system transfers the so modified list of payments either back to the Buyer or to a payments processor nominated by the Buyer.

Selected embodiments of the present invention may include:
Automatic invoice information transmission from buyer to invoice processing system
Automatic scoring
Automatic application of additional eligibility criteria provided by the funding provider
Automatic transmission of decision to funding platform
Automatic calculation of discount to apply and of payment to be made to supplier
Automatic creation of payment instruction and transmission of the payment instruction to the financial institution executing payments
Automatic reporting of executed funding transactions to the buyer
Automatic flagging of funded invoices in the buyer's systems
Web-based portal allowing suppliers to access information relating to their invoices allowing them to reconcile payments received
Web-based portal allowing funding providers view the pool of invoices currently being funded, their status, and the past performance of the pool of funded invoices
web-based portal giving the Buyer visibility over all invoices processed by the system
transmission of scores to buyer
transmission of buyer's approval decisions to the platform
transmission of final settlement instructions
Offsetting/adjustments for overpayments

BRIEF DESCRIPTION OF DRAWINGS

Embodiments of the present invention will now be described, by way of example only, with reference to the accompanying drawings in which:

FIG. 1 is a schematic diagram of a system according to an embodiment of the present invention.

DETAILED DESCRIPTION

FIG. 1 is a schematic diagram of a system according to an embodiment of the present invention.

The finance management platform 10 comprises a model element data repository 20 encoding a plurality of model elements representing invoicing outcomes, each model element including a score value, and a processor 30 configured to execute computer program code for providing a finance management platform for a plurality of clients.

The computer program code includes computer program code configured to receive invoicing data from a client data repository 40 remote from the finance management platform 10, computer program code configured to translate the received invoicing data into a common format and store the invoicing data in the common format in an invoice data repository 50.

The computer program code further includes computer program code configured to access the model element data repository 20 and determine one or more of the model elements applicable to the invoicing data, computer program code configured to calculate an overall score for the invoicing data from the applicable model element's scores, and computer program code configured to trigger a communication to a payment processor 60 and an update to the invoice data repository upon the overall score exceeding a predetermined threshold.

Preferably, the platform 10 includes an input connector 15 whose function it is to communicate with and extract the relevant information (invoicing data) from the buyer's IT systems.

The invoicing data, in addition to data on invoices received, may also include data on credit notes, purchase orders, remittances and other invoicing associated data. Preferably, the invoicing data is captured from a client's enterprise resource planning system or similar system. This may be done on a batch basis (for example, the ERP system's ledgers or databases may be interrogated overnight to obtain changes since last connection) or it may be done in substantially real-time.

Where necessary, the obtained invoicing data is translated into a common format such as UBL (Universal Business Language). This may be done via mappings from the ERP system fields to UBL fields (if the format of the ERP system is known) or it may be done heuristically or via an approach such as machine learning to determine the best mapping or bespoke mappings. For example, the obtained invoicing data may be placed in a queue at the finance management platform 10 and processed in turn from the queue. Depending on the client, mappings may be predetermined, they may be evaluated during a training phase such that a best fit of mapping(s) is determined from a feedback process (which may apply AI type learning such as neural networks, genetic algorithms etc). Optionally, the system may be set to permanently evaluate and learn from incoming invoicing data so as to refine mappings and/or develop new mappings should a fitness evaluation for existing mappings score below a predetermined threshold or should it be found that certain critical data fields are missing once a mapping is applied.

A large number of data fields are sought from the queued data, including the following: supplier identification, invoice amount, currency, date, line item detail of the invoice (line item text, units of measure, count, amount, applicable VAT rate), information pertaining to any purchase orders related to the invoice, or goods receipt notes/warehouse entry notes relating to the goods referenced in the invoice.

The input connector 15 is preferably able to communicate with common ERP applications and invoice workflow applications to automatically collect incoming invoices from the buyers. It preferably obtains and automatically forward incoming invoices and approval decisions to the finance management platform 10 for storage in the invoice data repository 50. Furthermore, this part of the system also handles the communication of planned and modified payment instructions in relation to the buyer's payment runs.

The invoice data repository 50 is used to store both historical data and ongoing information about the status of the invoices being processed by the platform 10.

The data stored here is used both for managing supply chain financing and also in building and refining model elements representing invoicing outcomes.

In one embodiment, the computer program code operates a scoring engine whose function it is to assess the likelihood of invoice dilution.

The scoring engine predicts the likelihood of the buyer settling a certain invoice (he might not settle due to the invoice being disputed or the buyer being in financial difficulties) and the likelihood of recovering the funds if the buyer does not settle. The algorithm computes these numbers based on a variety of past and current data on the buyer and on his relationship with the supplier that sent this invoice from model elements generated from data in the invoice data repository.

This scoring engine is used for several tasks:

Firstly, to predict the result of the approval process and thus to make a financing decision instantly.

Secondly, to make the risk for funders measurable and more manageable as it is used to compute a rating score for the payment.

And thirdly, as additional benefit, the results computed can be used rank invoices, e.g. from "most likely to be rejected" to "most likely to be approved", giving buyers the opportunity to make approval processes more efficient by working through the most problematic invoices first.

Preferably, the data repository 20 encoding a plurality of model elements representing invoicing outcomes is not static and is added to and/or refined over time based on the invoicing data held in the invoice data repository by a model supervisor system. Preferably, the model elements in the data repository 20 define a standard baseline that applies to all clients. These are then modified or supplemented by client specific model elements (for example reflecting that invoices form certain suppliers should always be approved). Preferably, the model supervisor system includes a machine learning system that monitors the model elements and is arranged to automatically add to them, remove them or modify them upon detecting a mismatch with behavior detected from the invoicing data being added to the invoice data repository.

As discussed above, preferably the scoring engine does not apply one monolithic large function, but rather a concatenation of multiple model elements (which preferably represent or encode functions). In a preferred embodiment, one model element (function) takes the output of the preceding model element(s) as input. The entire computation is therefore organised in a DAG (directed acyclic graph), where at the root of the graph there is the invoice input data, a number of intermediate transformation steps occur that transform this data, and the final function at the end of the graph has the actual score as an output.

Organising the computation this way has important advantages in that it allows easier maintenance and monitoring of the computations, as well as making model element maintenance simpler.

Each intermediate transformation step can have parameters as secondary inputs that are optimized during fitting.

In the transformation steps, a number of different techniques are used to normalize and scale the inputs, to map inputs from textual inputs to numerical values, and to group inputs and remove outliers. The final scoring function then is an optimized function made of potentially a complex graph of model elements that can make best use of these inputs.

In fitting, different parameter combinations are trialed on a set of historical data where both the inputs, as well as the actually realized outputs (the "ground truth" or "target variable"), i.e. whether the Buyer has actually paid the invoice in question in full is known. For the given parameter constellation, each of the invoices in the training data is scored. The scores are then combined with the actual realisations to arrive at an overall error metric. A search over the space of all possible parametrisations is performed to identify that parameter set which minimises the error metric.

The performance of the functions during actual production is preferably monitored by recording the predictions of the functions and matching them against the (later) decisions by the buyers when the actual outcomes are known.

Preferably, one scoring engine per buyer is created and maintained. The complexity of each scoring function (and its associated acyclic calculation graph) will depend on the amount of training data used and also the complexity of the buyer's processes. It will be appreciated that the platform may operate a processor and memory to act as a single scoring engine (or it may implement multiple scoring engines operated by one of multiple processors that process invoices from the queue in parallel), each engine being loaded with the appropriate graph etc to configure it to act as the scoring engine for the buyer of the invoice to be processed. Alternatively, one or multiple processors or processor threads or the like for each buyer may be operated. Each graph is preferably stored as code (in one embodiment, it may be a coded representation instructing the scoring engine which model elements to retrieve and how to connect them together to form the graph). Upon receipt of invoice data for a buyer, their respective graph is determined, read in and executed by the system. In one embodiment, a graph is described as the list of nodes (in this case the functions to execute) and a list of the directed edges between the nodes. The direction of the edge indicates which of the two nodes connected by the edge produced the intermediate result as output and which one uses it as input.

The fitting procedure is computationally quite intensive and it is preferably only performed at larger time intervals (e.g. monthly). If, however, there is a deterioration in the monitored performance to indicate that the structure of the problem has changed, or there is another reason to believe that the data structure has changed, the scoring function is re-fit more frequently.

In one embodiment, this scoring engine and/or the model supervisor system is hosted remotely of the platform 10 and/or uses resources from cloud service providers to make spikes in the workload more manageable and decrease costs.

As soon as the input connector and platform are configured to access a buyer's ERP system, historical data on the relationship between the buyer and its suppliers can preferably be gathered (this preferably includes already settled invoices so that model elements can be built from historic relationships and acts). If insufficient historical data is available, e.g. because the relationship with the supplier has not existed for long enough, it may be necessary to wait some time (in the order of a few months) until the first invoice is financed. This waiting period is to collect missing data on things like the number of disputed invoices is also necessary if the buyer builds up a new relationship to a supplier.

Optionally, only a predetermined classification of the received invoices are selected for funding. As has been discussed previously, a threshold is applied, typically to filter those invoices whose pattern/data do not match the buyer's or the default model element(s) for positive (non-disputed/rejected/part rejected) invoicing events. This is done in dependence on the scoring of the invoice and those invoices below the score threshold are preferably notified to the buyer for investigation and/or direct payment. It will be appreciated that other factors may also be taken into account in scoring, for example, amount of invoice, a supplier not being registered with the platform 10 etc. Preferably, the platform includes a communication interface configured to provide reconciliation and payment information to and from the buyer's system.

Optionally, the platform 10 includes a communication and reporting system which is arranged to communicate the scoring results, suggested payments, and other programme-related information to the stakeholders (Buyer, Suppliers, and Funding Providers).

This preferably includes a human-readable interface between the platform 10 and the stakeholders. This interface gives suppliers information necessary to reconcile their payments they received with the outstanding invoices. It also allows buyers, suppliers and funders to view key parameters of the financing program and its performance. In addition to the human readable form, reporting information can also be produced and transmitted in electronic form to other computer systems.

Optionally, the platform may include a monitoring system which is used to coordinate the activities of the other components. This component ensures all processes proceed quickly and smoothly. It can also act as a gatekeeper to ensure only valid actions and requests for data are conducted.

Where necessary, embodiments of the present invention are also supported by a set of legal contracts that regulate the interactions of the stakeholders in the legal domain.

Operation of Embodiments

First, the buyer orders goods or services from a supplier through the usual means. No restrictions are placed on this, so neither the buyer nor the supplier need to change their business processes. At some predetermined time, the supplier fulfils the order in anticipation of being paid. Shortly thereafter, the supplier sends the invoice to the buyer through the usual channels.

While the invoice being sent and paid after receipt of the goods or services by the supplier is the usual case, embodiments can also be applied for other invoicing flows, for example if the invoice is being sent before goods or services have been supplied.

Similarly, embodiments can be applied to Purchase Order (PO) financing. Traditional PO financing solutions suffer problems regarding scalability and risk transparency that are very similar to the described problems for traditional SCF programmes.

If embodiments are applied to PO financing, the first payments are made to the supplier at the time of the PO. By using the scoring engine to estimate the final size of the invoice additionally to scoring the probability of the buyer approving and paying the invoice that is sent at a later time, the risk and problems of scalability of present PO finance programs are greatly reduced.

The timing is the same as in SCF, except for the algorithm's decision to authorise or decline payment and the decision on the fraction of the expected size of the invoice being paid is moved to the time of the purchase order, together with the issuance of the payment.

As soon as this invoice is entered into the buyer's ERP system, it is forwarded to the platform automatically. This automatization ensures minimal time delay between the buyer receiving an invoice and it being paid. As this process does not involve human interaction, the buyer does not have to change its processes of receiving and paying invoices; his employees only have to enter the invoice into the company's ERP system which would have been done anyway.

The algorithm described above now evaluates the probability of the buyer settling the invoice and the probability of recovery if the buyer should not settle the invoice (for whatever reason). If a certain threshold is reached, the platform notifies the funders who then, again without human interaction, pay the invoice (minus a rebate granted by the supplier for fast payment).

One can also easily envision a system that, instead of computing a binary fund/do not fund decision, classifies the invoice into one of several categories. For each of those categories different rebates and other conditions could apply. This latter approach, while possibly computationally more expensive, allows the embodiments to be used by a larger number of companies and allows it to cater to a larger number of funders with different preferences for risk and profit margins. It should be emphasized that multiple funders can operate with the platform, either against different categories/risk of finance, different groupings of buyers/suppliers or else collectively against a common pool of SCF invoices.

After some time, the buyer has evaluated and approved or rejected the invoice. This decision is then shared with the platform. Because the invoice has already been paid, the programme's viability does not depend on the speed of the buyer's evaluation process, although a certain improvement in funding cost may be realized upon invoice approval.

Based on this decision, one of two actions will be taken.

The usual case is the invoice being approved. Here, the buyer will settle invoice after a relatively large amount of time, one larger than the time allowed to wait with payment without supply chain financing.

If the buyer does not settle an invoice despite approving it, the usual steps for recovery of the funds will be taken.

There are situations in which the buyer will not settle the invoice with a full payment of the invoice face amount (invoice rejection). While unlikely, this situation is possible since the scoring engine only scores on a statistical basis. An invoice rejection can occur for a variety of reasons, e.g. the application of a credit note or an invoice adjustment, or an invoice dispute, for example due to faulty goods and services. In this situation, the amount originally paid on the invoice by the funding provider (the overpayment) will have to be recovered from the supplier.

Embodiments deal with this as follows. First, they automatically identify and track such overpayments, using the data received from the buyer data feed. Embodiments furthermore monitor and identify future planned payments from the buyer to the supplier, and identifies the deductions that need to be made from any such payments until the overpayment is recovered. These deductions are communicated to the buyer's systems and automatically implemented in the corresponding payment instructions.

If, following this process, an overpayment cannot be fully recovered within a given time, the system reports this separately in order to be recovered through other channels.

The currently preferred implementation is as a process that connects buyers (who want to have their invoices financed) to funders. The number of funders is not limited and it is also possible for the company that implements the platform to itself act as a funder.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A finance management platform comprising:
a processor;
a model element data repository encoding a plurality of model elements representing invoicing outcomes, each model element including model element computer program code that when executed by the processor causes the processor to at least receive invoicing data and output a score value;
an invoice data repository comprising historical invoicing data and current invoicing data;
finance management platform computer program code executable by the processor, the finance management platform computer program code being for providing the finance management platform for a plurality of clients, and when executed by the processor, the finance management platform computer program code causes the processor to at least:
receive invoicing data for an invoice from a client data repository remote from the finance management platform;
translation computer program code executable by the processor, and when executed by the processor, the translation computer program code causes the processor to at least
translate the received invoicing data into a common format; and
store the invoicing data in the common format in the invoice data repository;
generation computer program code executable by the processor, and when executed by the processor, the generation computer program code causes the processor to at least:
cause invoice data to be monitored for invoices received over time;
use the monitored invoice data to select a plurality of the model elements from the plurality of the model elements in the model data element repository; and
generate, for each client, a client specific scoring engine from the selected plurality of the model elements, wherein the generated client specific scoring engine combines the model element computer program code of the selected plurality of the model elements in the model element data repository;

calculation computer program code executable by the processor, and when executed by the processor, the calculation computer program code causes the processor to at least calculate an overall score for the invoicing data received for an invoice by executing the client specific scoring engine corresponding to the client for the invoicing data whereby the combined computer program code outputs an overall score, the overall score being calculated from each of an applicable model element's scores such that an output of first model element of the selected plurality of model elements corresponds to an input to a second model element output of the selected plurality of model elements when the first model element is determined to be a directed edge to the second model element, the overall score representing a likelihood of the invoice being settled by the client, and the overall score being based at least in part on the current invoicing data and the historic invoicing data of the client; and, trigger computer program code executable by the processor, and when executed by the processor, the trigger computer program code causes the processor to at least: trigger a communication of a payment instruction to a payment processor and an update to the invoice data repository upon the overall score exceeding a predetermined threshold.

2. The finance management platform of claim 1, wherein the finance platform computer program code includes:

identification computer program code executable by the processor, and when executed by the processor, the identification computer program code causes the processor to at least: identify and link the invoicing data relevant to an invoicing outcome for the invoice from the client data repository, and wherein, when executed by the processor, the translation computer program code further causes the processor to at least:

translate the received invoicing data into the common format and store the invoicing data in the common format in the invoice data repository including storage computer program code configured to store the linked invoicing data in the common format in the invoice data repository.

3. The finance management platform of claim 1, wherein the invoicing data includes data from a content of the invoice and from content concerning the invoice selected from of one or more of another data item, another data source or another data entry.

4. The finance management platform of claim 1, further comprising an input connector executable by the processor, and when executed by the processor, the input connector causes the processor to at least communicate with the client data repository and to determine and extract the invoicing data from the client data repository.

5. The finance management platform of claim 4, wherein when executed by the processor, the input connector further causes the input connector to identify a type of the client data repository, retrieve a predetermined mapping associated with the type and determine and extract the invoicing data using the predetermined mapping, the predetermined mapping comprising a plurality of links, each linking one or more of a data field, a plurality of data fields or part of a data field in the client data repository to an invoice data item.

6. The finance management platform of claim 4, wherein the input connector further comprises a machine learning engine executable by the processor, and when executed by the processor, the machine learning engine causes the processor to at least: retrieve data from the client data repository and apply machine learning to determine an optimal mapping from a plurality of predetermined mappings to extract the invoicing data, the optimal mapping comprising a plurality of links, each linking one or more of a data field, a plurality of data fields or part of a data field in the client data repository to an invoice data item.

7. The finance management platform of claim 4, wherein the input connector further comprises a machine learning engine executable by the processor, and when executed by the processor, the machine learning engine causes the processor to at least: retrieve data from the client data repository and apply machine learning to generate an optimal mapping to extract the invoicing data, the optimal mapping comprising a plurality of links, each linking one or more of a data field, a plurality of data fields or part of a data field in the client data repository to an invoice data item.

8. The finance management platform of claim 7, wherein when executed, the machine learning engine further causes the processor to at least access the client data repository over a period of time and optimize the optimal mapping in dependence on the data in the data repository over the period of time.

9. The finance management platform of claim 7, wherein when executed the input connector further causes the processor to at least score a fitness score of the mapping and activate the machine learning engine to re-optimize the optimal mapping upon the fitness score being below a predetermined threshold.

10. The finance management platform of claim 1, wherein each of the model elements comprises a function that is performed when its respective model element computer program code executable code is executed by the processor as part of the client specific scoring engine, the combined model element computer program code defining a directed acyclic graph, and when executed by the processor the calculation computer program code further causes the processor to at least calculate an overall score for the invoicing data and execute the combined model element computer program code of the client specific scoring engine and apply the function for each of the model elements of the combined model element computer program code to the invoicing data in an order determined from the directed acyclic graph to calculate the overall score.

11. A finance management method for processing invoicing data for a plurality of invoices comprising:

storing in a model element data repository a plurality of model elements representing invoicing outcomes, each model element including model element computer program code configured to receive the invoicing data of one of the plurality of invoices and output a score value;

executing, by a processor, finance management platform computer program code for providing a finance management platform for a plurality of clients, including:

receiving the invoicing data for one of the plurality of invoices from a client data repository remote from the finance management platform;

translating the received invoicing data into a common format;

storing the invoicing data in the common format in an invoice data repository comprising historical invoicing data and current invoicing data;

monitoring the invoicing data for invoices received over time;

selecting a plurality of the model elements from the plurality of model elements in the model element data repository based at least in part on the monitored invoicing data;

generating, for each client, a client specific scoring engine the selected plurality of the model elements, wherein the client specific scoring engine being configured to combine the model element computer program code of the selected plurality of the model elements;

executing the client specific scoring engine for the received invoicing data received for an invoice to calculate an overall score for the invoicing data from an applicable model element's scores, the overall score being calculated from each of the applicable model element's scores such that an output of first model element of the selected plurality of the model elements corresponds to an input to a second model element output of the selected plurality of the model elements when the first model element is determined to be a directed edge to the second model element, the overall score representing a likelihood of the invoice being settled by the client, and the overall score being based at least in part on the current invoicing data and the historic invoicing data of the client; and triggering a communication of a payment instruction to a payment processor and an update to the invoice data repository upon the overall score exceeding a predetermined threshold.

12. The finance management method of claim 11, wherein each of the model elements comprises a function that is performed when its respective model element computer program code executable code is executed as part of the client specific scoring engine, the method further comprising:

storing a directed acyclic graph of the plurality of the model elements applicable to the invoicing data; wherein calculating an overall score for the invoicing data from the applicable model element's scores includes:

applying the function, by executing the model element computer program code for each of the applicable model elements, to the invoicing data in an order determined from the directed acyclic graph to calculate the overall score.

13. The finance management method of claim 12, wherein the directed acyclic graph has a root model element, one or more intermediate model elements and one or more final model elements, wherein a directed acyclic graph models topological ordering of the root model element, the one or more intermediate model elements and the one or more final model elements, the method further comprising inputting the invoicing data at a root of the directed acyclic graph and applying the corresponding function for the root model element to determine the initial score, following the topological ordering and applying the function for each intermediate and final model element reached and outputting the score from the final model element.

14. The finance management method of claim 13, further comprising generating the directed acyclic graph by fitting the plurality of model elements to a sample of the historic invoicing data and corresponding invoicing outcomes obtained from the client data repository.

15. The finance management method of claim 14, wherein a functions associated with at least selected ones of the model elements include a parameter, the method further comprising optimizing the parameters in dependence on a sample during fitting.

16. The finance management method of claim 12, storing the directed acyclic graph further comprising storing an encoded representation instructing the plurality of model elements of the directed acyclic graph to be used and how to connect them together to form the directed acyclic graph, the method further comprising recomposing the directed acyclic graph from the encoded representation prior to executing the model element computer program code for each of the applicable model elements.

17. The finance management platform of claim 1, wherein causing the invoice data to be monitored further comprises causing invoicing data for a plurality of invoices to be monitored that is received from the client data repository over time and the generation computer program code further causes the processor to at least generate client-specific model elements from the plurality of model elements in the model element data repository and generate the client specific scoring engine from the plurality of model elements including a client specific model elements.

18. The finance management platform of claim 17, further comprising a machine learning system executable by the processor, wherein, when executed the machine learning system causes the processor to at least: automatically update the client specific model elements and the client specific scoring engine in dependence on invoicing data received from the client data repository.

19. The finance management platform of claim 1, wherein each client specific scoring engine is stored in a data repository as an acyclic graph linking the plurality of model elements of the client specific scoring engine together, wherein upon receiving invoicing data for the client, the finance management platform computer program code further causes the processor at least retrieve the acyclic graph for the client specific scoring engine from a data repository, load the plurality of model elements for the client specific scoring engine into a memory and execute the client specific scoring engine for the invoicing data.

20. The finance management platform of claim 1, wherein, when executed, the calculation computer program code further causes the processor to at least:

determine whether an amount of historical data available in storage is sufficient based at least in part on one or more historical data thresholds; and calculate an overall score for the invoicing data using the current invoicing data and the historical invoicing data when the amount of historical data in storage is determined to be sufficient.

21. The finance management platform of claim 1, wherein the client specific scoring engine comprises a directed acyclic graph defined by a list of nodes and a list comprising a plurality of directed edges, individual nodes of the list of nodes corresponding to a respective executable function associated with a respective model element of the selected plurality of the model elements, and a respective directed edge in the list comprising the plurality of directed edges indicating which two nodes are connected and a direction in which the two of the individual nodes are connected.

* * * * *